D. H. TWAITS.
GREASE CUP CAP.
APPLICATION FILED DEC. 30, 1913.

1,200,903.

Patented Oct. 10, 1916.

Witnesses

Inventor
Daniel H. Twaits,
By Albert H. Baker.
Atty

UNITED STATES PATENT OFFICE.

DANIEL H. TWAITS, OF CHICAGO, ILLINOIS.

GREASE-CUP CAP.

1,200,903.

Specification of Letters Patent.

Patented Oct. 10, 1916.

Application filed December 30, 1913. Serial No. 809,460.

*To all whom it may concern:*

Be it known that I, DANIEL H. TWAITS, a citizen of the United States, residing at Chicago, in the county of Cook and State of Illinois, have invented a certain new and useful Improvement in Grease-Cup Caps, of which the following is a full, clear, and exact description, reference being had to the accompanying drawings.

This invention relates to grease cups of a type wherein there are two members, one of which screws onto the other and a spring detent is provided on one of the members for engaging the other member to prevent the members becoming inadvertently separated.

The object is to provide an efficient detent spring which may be very cheaply manufactured from one piece of spring metal, and may have means integral therewith for securing it to one of the members of the cup.

The invention is hereinafter more fully described and the essential characteristics set forth in the claims.

Figure 1:
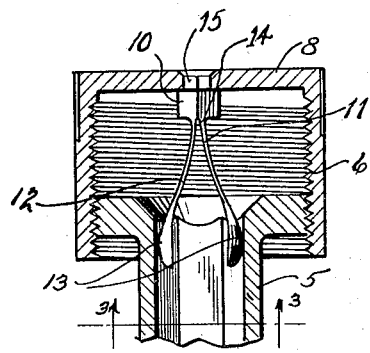
Figure 2:
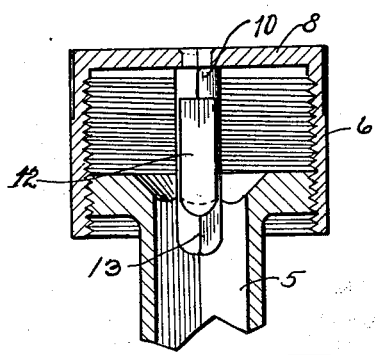
Figure 3:
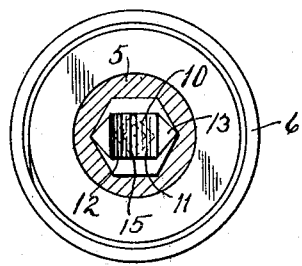
Figure 4:
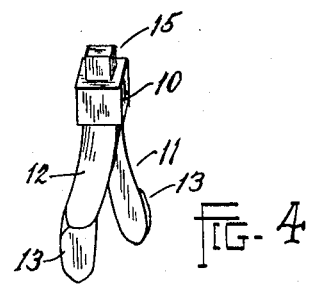

Figure 1 is a central vertical section of the grease cup showing my spring mounted in the cap; Fig. 2 is a central vertical section of the same taken at right angles to the plane of Fig. 1; Fig. 3 is a sectional view taken on the line 3—3 of Fig. 1 looking upwardly into the cap; Fig. 4 is a perspective view of my detent spring before being mounted in the cap.

The body portion designated 5 preferably has an angular interior forming in effect vertical grooves, and has an outwardly extending portion externally threaded and engaging internal threads on the cylindrical wall of the cap 6. The upper end of the cap is closed by a horizontal wall 8 which carries the detent spring, as hereinafter described. The detent spring comprises a head 10, two downwardly depending flaring legs 11 and 12 integral therewith and having at their lower ends projecting portions, or corners 13, which engage the inside corners or vertical grooves in the body. At the upper end the head 10 is provided with an upwardly extending lug 15 which fits into a suitable opening in the closed end 8 and is upset therein to securely hold the spring in place. This upwardly extending lug is preferably angular which thereby prevents the turning of the spring with relation to the cap. The spring is preferably formed from one piece of spring metal, in the following manner: the straight piece of metal is preferably cut away on two sides, forming the outer surfaces of the legs 11 and 12, and leaving the metal thin and resilient after the piece is split upwardly, by any suitable means, to substantially the bottom of the head 10 as at 14. The legs are then bent outwardly to substantially the shape shown. A portion of the lower end of the legs which is not cut away, projects outwardly forming projections which engage the interior of the cup body.

The piece from which the spring is formed may be circular or angular, but is preferably square, as shown, and the portions which are cut away to leave the thin resilient part of the legs are taken from opposite corners and the projecting portions 13 which are left present substantially square corners to the interior of the body portion. These are rounded at their lower ends, however, to facilitate their insertion in the body portion, when the cap is screwed in place. There may be one or more grooves in the body portion which the spring engages, but the interior of the body portion may be conveniently made hexagonal, as shown in Fig. 3, which also shows the projections 13 engaging the interior of the body portion.

It will be seen from the foregoing description that I have provided a detent spring which may be very conveniently formed from spring metal cut in proper lengths from a suitable rod, and when secured in place as described, such spring is durable and efficient in operation.

Having thus described my invention, what I claim is:

1. In a grease cup, the combination of a cap, a body portion and a spring member, comprising two outwardly flaring legs, a joining portion at their upper ends integral therewith, and means integral with the joining portion for securing the same to the cap, said legs having a thin portion adjacent the joining portion and a thicker portion at their lower ends for engaging the interior of the body member.

2. In a grease cup, the combination of a body portion and a cap threaded onto the body portion, a spring member carried by the cap and comprising a head having an upwardly extending lug engaging the top of the cap, two downwardly extending flaring legs having a thin resilient portion adjacent the head and each having an outwardly projecting portion at its lower end adapted to engage the interior of the body portion.

3. In a grease cup, the combination of a body member having an angular interior, a cap threaded onto the body member and a spring member carried by the cap comprising an angular lug engaging the top of the cap and downwardly extending outwardly flaring legs integral with the head having thin resilient portions adjacent the head and extending for a considerable distance of their length and having outwardly projecting converging surfaces at their lower edge corresponding to two opposite corners of the angular head.

4. In a grease cup, the combination of a cap, a body portion coöperating therewith, a spring member having a plurality of outwardly flaring legs integral with a joining portion at their upper ends, and an upwardly extending lug integral with this joining portion extending through the top of the cap and being upset whereby it is held in position, said legs having thickened integral outwardly projecting humps engaging the interior of the body portion.

5. In a grease cup, the combination of a body member having an angular interior, a cap threaded onto the body member, and a spring member carried by the cap comprising a comparatively large head having a flat shoulder engaging the top of the cap and secured thereto, downwardly extending outwardly flaring legs integrally connected with the head, said legs being of equal size and separated to a point adjacent the head and tending to spring outwardly to engage the angular interior of the body.

6. In a grease cup, the combination of a cap and a body portion coöperating therewith, a spring member secured to the cap and rotatably engaging the body portion, said spring member comprising a pair of outwardly extending legs having their lower ends adapted to engage the body portion and integrally connected at their upper ends with an enlarged head portion having a flat shoulder adapted to lie against the underside of the top of the cap, and means extending upwardly from the head portion for securing it to the top of the cap.

In testimony whereof, I hereunto affix my signature in the presence of two witnesses.

DANIEL H. TWAITS.

Witnesses:
 JUSTIN W. MACKLIN,
 BRENNAN B. WEST.

Copies of this patent may be obtained for five cents each, by addressing the "Commissioner of Patents, Washington, D. C."